June 9, 1936.  W. T. FERGUSON  2,043,536
SPRING COVER AND ITS MANUFACTURE
Filed Dec. 18, 1934  2 Sheets-Sheet 2
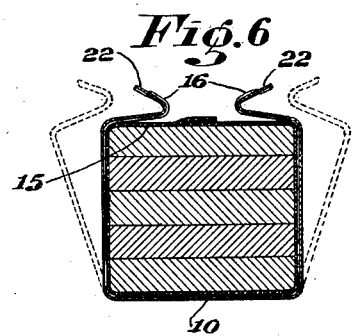
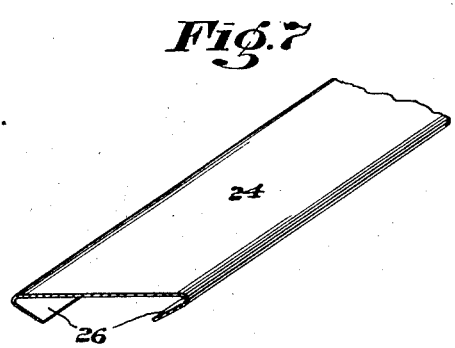
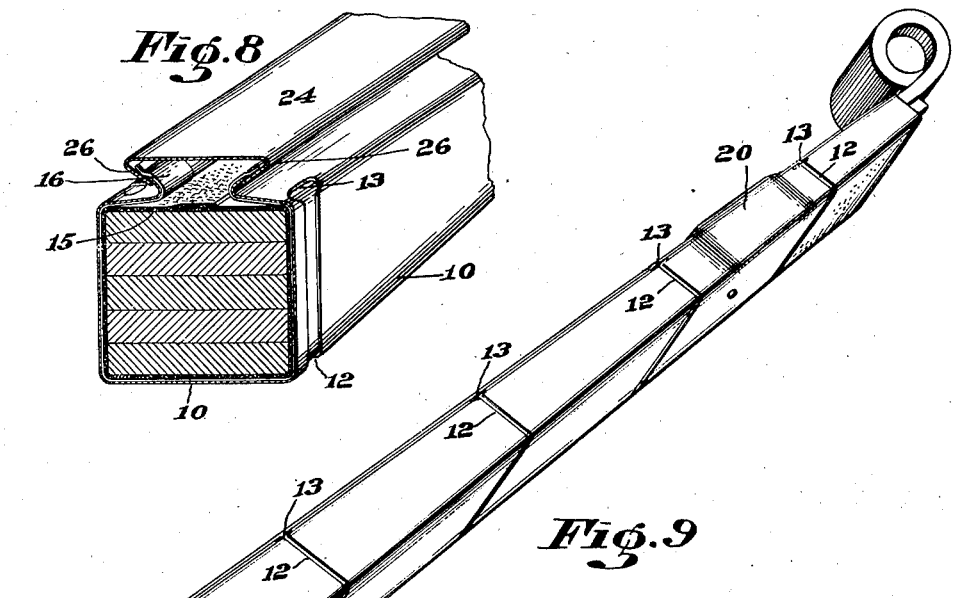
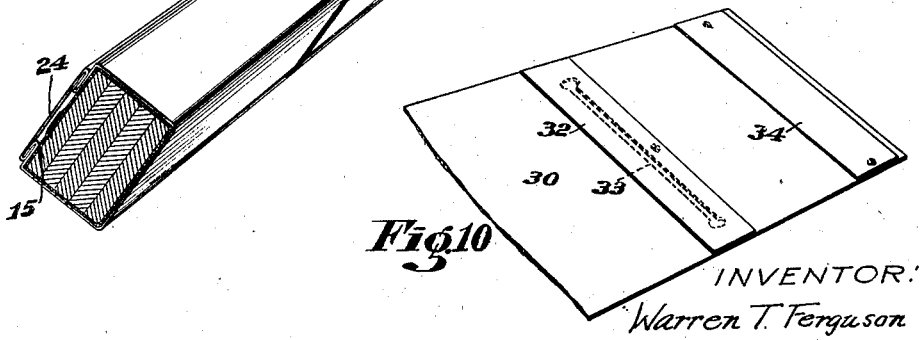
INVENTOR:
Warren T. Ferguson
by his attorney
Warren G. Ogden Patented June 9, 1936

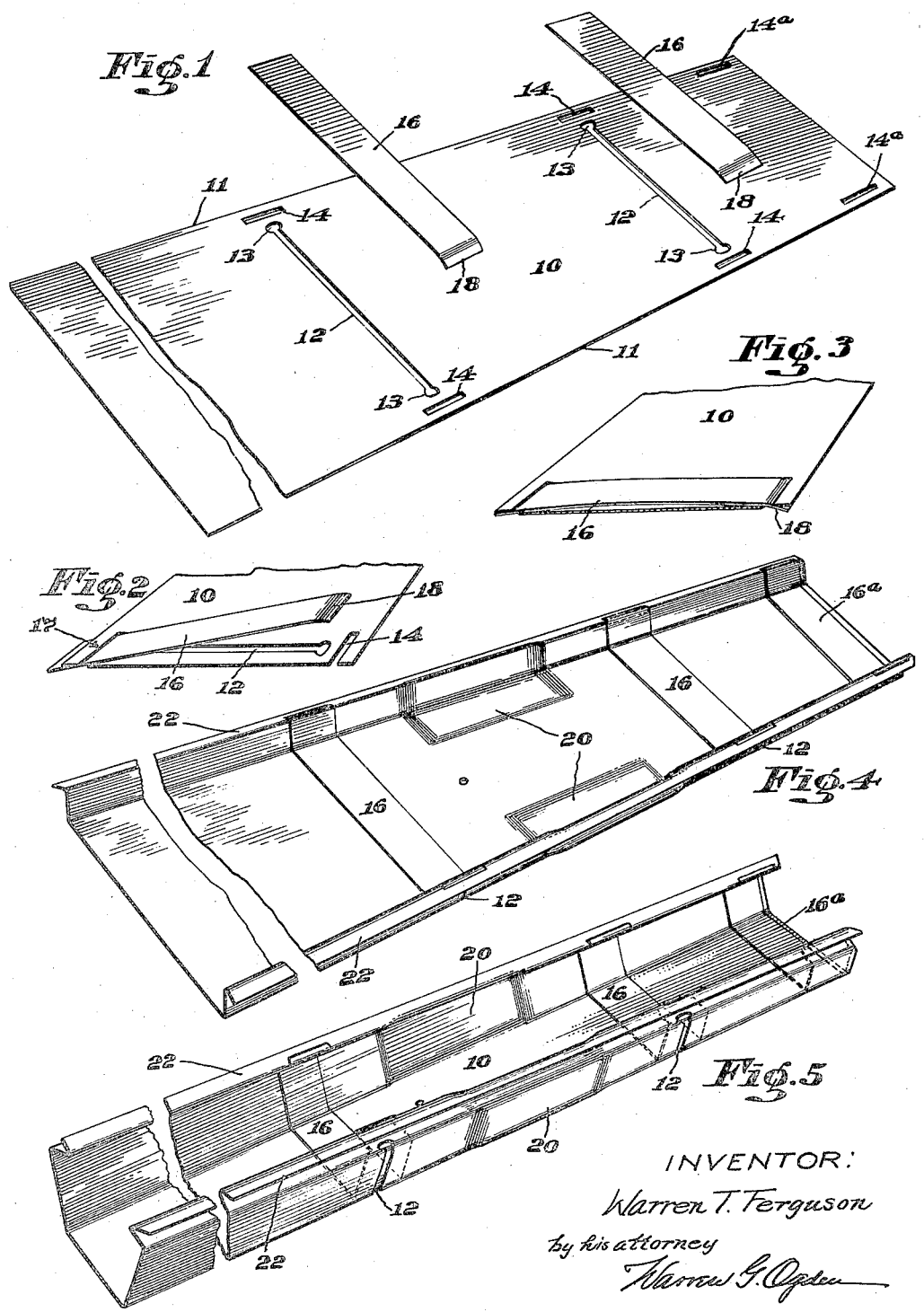

2,043,536

UNITED STATES PATENT OFFICE 2,043,536

SPRING-COVER AND ITS MANUFACTURE

Warren T. Ferguson, Waban, Mass., assignor to Anderson Manufacturing Company, Cambridge, Mass., a corporation of Massachusetts Application December 18, 1934, Serial No. 758,068

20 Claims. (Cl. 153—1)

This invention relates to the manufacture of covers, with which the chassis springs of automobiles are now generally equipped, for the purpose of excluding dirt and water from the spring and for retaining a greasing compound suitable for stabilizing spring action and for lubrication between the several leaves or plates composing the spring. The invention, in its broader aspects, may be employed as a casing for multiple leaf springs anywhere, its field of usefulness not being limited to the automotive trade.

One object of this invention is to produce a novel and improved spring-cover having advantages over similar spring-covers now available in respect to simplicity of construction, economy of manufacture and ease of installation. Accordingly a feature of the invention consists in the employment of a single channel-shaped section for enclosing at least three sides of the spring throughout the length of the portion to be covered but having novel provision for permitting this single unit to conform unresistingly to the changing shape of the spring as the load varies and while secured in position on the spring by a suitable flexible closure at the fourth side thereof.

A further object of this invention is to produce a spring-cover that, if desired, will eliminate the need of a special clip or clips, separately applied to the spring leaves, to prevent "fanning". This feature is found in a construction and arrangement providing for transverse metallic bands or clips arranged to be carried by the channel-shaped section so that the assembly of cover and clips may be handled and installed as one unit. The preferred construction is to secure these binding clips to the cover at the interior of the channel thereby retaining a substantially smooth and well proportioned exterior. Should the spring, or the conditions under which it operates, be such that a special clip to prevent fanning is required the cover blank may easily be enlarged through the required area while being shaped to channel form.

A still further object of this invention is to provide a new process of manufacturing spring-covers having the characteristic features hereinafter described.

To the accomplishment of these objects and such others as may hereinafter appear, as will readily be understood by those skilled in the art, the invention comprises the features and combinations of parts and processes of manufacture hereinafter described and then particularly pointed out in the appended claims.

The nature and scope of the invention and its manufacture will be understood from a description of the preferred embodiment thereof illustrated in the accompanying drawings, in which:

Figure 1 is a view, in perspective, of a sheet metal blank, of trapezoidal form from which the channel-shaped lower section of the spring-cover is shaped to fit about a multiple leaf spring, and showing above a pair of cooperating clip bands;

Figs. 2 and 3 showing fragmentary portions of the blank, in perspective, are illustrative of the manner in which the clip bands are engaged with slots in the blank so as to be carried on one face thereof;

Fig. 4 is a view, in perspective, of the assembled blank and clips after the first stamping. This figure shows marginal portions recessed so that the spring-cover will accommodate a special clip to prevent fanning should such a clip be required;

Fig. 5 is a view, in perspective, of the assembled blank and clips after the second stamping producing the channel-shaped section;

Fig. 6 is a view, in cross-section, through a multiple leaf spring showing the channel-shaped section of the cover as it is first assembled on the spring (dotted lines) and then in its final position (full lines) before the closing strip is applied;

Fig. 7 is a view, in perspective, of a fragmentary portion of the closing strip;

Fig. 8 is a view, in perspective, of a fragmentary portion of a spring with the closing strip slipped onto the channel-shaped section at the top side of the spring;

Fig. 9 is a view, in perspective, of the portion of a spring to be covered with this novel cover locked thereon by hammering down the interengaging flanges of the channel-shaped section and the closing strip; and Fig. 10 is a view, in perspective, of a portion of a transversely slotted blank for the lower section showing another way in which clip bands may be held on one face while being formed-up to a channel-shaped section.

In the manufacture of the kind of spring-cover shown in the accompanying drawings, which comprises a lower channel-shaped section (see Fig. 5) and a top closing strip (see Fig. 7), the channel-shaped section is produced from a blank 10 cut to trapezoidal shape for fitting closely about one end of a multiple leaf spring, for example the chassis spring of an automobile. The best commercial results have been obtained by the use of metal adapted to be formed-up in a stamping or die press but this invention, in certain aspects, is not restricted to metal; any other sheet material may be used that will meet the requirements of purchasers and be satisfactory under the conditions of use.

The blank 10, at any suitable stage in its production, will be perforated at intervals by a longitudinal series of transverse slots 12 each terminating at each end short of the side edges 11 of the blank. The function of this series of slots is to permit the tubular casing, which otherwise would be inherently stiff, to flex freely with the changing shape of the spring when in action. In order that the metal, or other stock, will not break through fatigue under constant flexing, the ends of each slot terminate in an enlarged opening 13 that is wider than the slot. Each slot is so proportioned relative to the width of the blank that its enlarged terminals 13, which may suitably be ovals with their major axes longitudinal of the spring-cover thus broadening the zone over which the flexing of the intermediate uncut portions of the cover occurs, will lie over or lap beyond a corner of the spring after assembly of the cover therewith (see Fig. 8). For further advantages of the type of flexing slot illustrated as preferable, reference may be had to my United States Patent No. 1,777,300, October 7, 1930, wherein this improved feature is claimed.

In practice, after packing the spring leaves with a greasing compound, the spring is wrapped with a liner for excluding dirt and water as shown at 15 in Figs. 6 and 8 and if the liner is canvas as is customary, the compound will eventually leak through and extrude at the slots 12. Under such a condition the slots should be covered and the preferred mode of covering them will now be described, it being understood, however, that the provision of a fluid proof or grease tight liner may make slot covers, for the purpose named, unnecessary. On the other hand slot covers may render a liner unnecessary.

In one form of the invention the imperforate margin of the blank 10 at each end of each slot 12 may be provided with a longitudinal slot 14. The function of each pair of slots 14 is to loosely or frictionally hold a transverse band 16 on the blank and form a unitary banded blank so that at the time the blank is formed-up to a channel these bands will necessarily be carried by the blank in positions over the transverse slots and may not be displaced therefrom during the process of manufacture or later. A band 16 is attached to the blank in position to cover a slot 12 by slipping one end through a slot 14, then bowing the band slightly about its line of contact 17 (Fig. 2) as a fulcrum and then slipping its free end through the other slot 14 of the pair at the same time pushing it forward slightly to center it as shown in Fig. 3. In order to facilitate entry of the end of a band into the second slot 14 this end may be preliminarily bent at a slight angle to the remaining portion of the band as shown at 18.

While the transverse bands 16 are useful as covers for the transverse slots 12 one or more of them may be carried by the spring cover and function as a clip to prevent fanning of the spring leaves. In view of this dual function they are designated herein as "clip bands". With a grease tight liner, or even with a canvas liner if such is deemed satisfactory under the slots 12, one or two metal bands 16 carried by the spring-cover will ordinarily be sufficient to eliminate the necessity of applying a separate non-fanning clip about the spring leaves. If a special spring clip is used then the spring-cover blank will be provided with a recess to accommodate it, such recess being formed to lie in one or more walls of the cover, for example in the sides and top as shown at 20 in Figs. 5 and 9. The bands 16 are preferably, but not necessarily, metal when functioning as clips. Obviously a band may be applied to one or more of the transverse slots 12 and thus serve as both slot cover and spring clip.

After supplying a blank with clip bands as shown by Fig. 3 for example, it is formed-up to channel shape by suitable dies, preferably in two stampings. The result of the first stamping is shown by Fig. 4 and the second by Fig. 5. It will be observed that the channel-shaped section of Fig. 5 is left spread open sufficiently to permit of its being slipped on a spring (see Fig. 6) to form the bottom section of the cover. The edges of this bottom section are reversely turned forming two out-turned flanges 22 and one end of each clip band 16 underlies each flange while the bodies of all clip bands lie at the inner face of the channel.

The open side of the channel shaped section at the top or fourth side of the spring is closed by a flexible strip 24 (Fig. 7) having a pair of inturned edge flanges 26 spaced and shaped to engage the out-turned flanges 22. This closing strip, in the illustrated form of the invention, is substantially as disclosed in United States patent to Skok No. 1,284,482, November 12, 1918, and after the respective pairs of flanges have been engaged (Fig. 8) and then hammered down (Fig. 9) the ends of the clip bands are firmly clamped between said in- and out-turned flanges.

The blank 10 of Fig. 1 is shown as provided with longitudinal marginal slots 14a at its smaller end adapted for receiving the ends of an additional band 16a (illustrated in Figs. 4 and 5) which, when used, serves to reinforce and strengthen the outer end of the spring-cover where it receives the greatest strain from the tendency of the leaves to fan. Obviously an additional clip band may be used, if desired, at the inner end of the spring-cover or at other points intermediate its ends with or without bands over the transverse slots as illustrated.

Figure 10 shows a modification with respect to the means for holding clip bands on a blank 30 while it is being formed-up to channel shape. A simple mode of securement that will not show at the outer face of the spring-cover is spot-welding. There may be, for example, a single central weld as shown for the band 32 covering the slot 31 or a weld at each end as shown for the band 34. The invention is not limited in its broader aspects to any special mode of holding the bands in selected positions on the blank as will be understood from this specification. In this connection the term "slot", as applied to the openings in the blank at the ends of the transverse slots 12, is to be construed as inclusive of any kind of opening through which the end of a band 16 may be slipped to affix it to the blank.

While it is preferred to employ the specific construction and arrangement of the parts shown and described, since this construction and arrangement is the simplest and most efficient embodiment of the invention which has yet been devised, it will be understood that this construction and arrangement is not essential except so far as it is specified in the claims, and may be varied or modified without departing from the broader features of the invention.

The nature and scope of the invention having been indicated, and its preferred embodiments and method of manufacture having been specifically described, what is claimed as new, is:—

1. A spring-cover comprising a sheet shaped for enclosing at least three sides of a spring and transversely slotted at intervals between its ends, each slot terminating at each end short of the side edges of the sheet, a separate covering band for each slot, said bands being independent of each other, means for retaining each band individually in position, and means engaged with said sheet for closing the fourth side of the spring.

2. A spring-cover according to claim 1 in which a short longitudinal slot is provided in the margin of the sheet at each end of each transverse slot for receiving the ends of a band and maintaining its position upon a transverse slot.

3. A spring-cover comprising a channel-shaped section for enclosing at least three sides of a spring and a member engaged therewith for closing the fourth side, a longitudinal series of transverse slots in said channel-shaped section each of less length than the peripheral dimension of said section at its slotted area leaving an imperforate margin at each end of each slot, and means for reinforcing the spring-cover at said slotted areas.

4. A spring-cover according to claim 3 in which said reinforcing means is carried by and forms a part of said channel-shaped section.

5. A spring-cover comprising a channel-shaped section for enclosing at least three sides of a spring and having marginal securing means at the fourth side thereof, said section consisting of a single sheet of material having a plurality of transverse slots each lying intermediate said securing means and having a transverse clip band covering each slot, and a plate for closing the fourth side of the spring having marginal securing means for cooperating with said marginal securing means on the channel-shaped section.

6. A spring-cover comprising a single sheet of cover material formed to a channel-shaped section for enclosing three sides of a spring and having at least one narrow transverse clip band affixed to the channel between its ends, and a separate closure member for the open side of said channel-shaped section, said section and member having co-operating parts for securing them together and completely enclosing a spring.

7. A spring-cover comprising a channel-shaped section formed from a single sheet of metal slotted transversely at intervals to promote flexibility and having a plurality of independent transverse metallic clip bands affixed thereto, and a single member for closing the open side of said channel-shaped section.

8. A spring-cover comprising a channel-shaped section for enclosing at least three sides of a spring and having out-turned edge flanges at the fourth side of the spring, said section being provided with a plurality of transverse flexing slots and with a clip band overlying each slot, and a strip having inturned edge flanges engaging said out-turned edge flanges for closing the cover at the fourth side of the spring.

9. A spring-cover according to claim 8 in which each of said transverse clip bands has its ends passed through the wall of the channel at the folds forming said out-turned edge flanges to lie against said in- and out-turned flanges when the closure strip is applied.

10. A blank adapted to be formed into a channel shaped spring-cover section having flexing slots therein extending transversely thereof but terminating at each end short of each side edge of the blank, and narrow bands transversely affixed to the blank for separately covering each slot.

11. A blank adapted to be formed into a channel shaped spring-cover section having flexing slots therein extending transversely thereof but terminating short of each side edge of the blank, and having a short longitudinal slot in the margin at each end of a transverse slot, and a covering band at each oppositely disposed pair of longitudinal slots having its ends slipped through said pair of slots.

12. A blank of trapezoidal contour adapted to be formed into a channel shaped spring-cover section having internal transverse flexing slots each of less length than the width of the blank at the slotted area, said blank having at least one narrow independent transverse metallic clip band affixed thereto intermediate its ends.

13. A blank adapted to be formed into a channel shaped spring-cover section having a longitudinal series of transverse flexing slots each lying wholly within the side edges of the blank and carrying a longitudinal series of transverse clip bands each having a length substantially that of the width of the blank where a band is carried.

14. The method of making spring-covers which includes supplying a blank of relatively stiff material suitable for shaping to channel form having transverse flexing slots at intervals between its ends each slot terminating short of the side edges of the blank and also having pairs of short longitudinal slots in the margin of the blank one adjacent each end of a transverse slot, utilizing said pairs of slots for receiving the ends of flexible transverse bands held thereby at one face of the blank over transverse slots, and thereafter forming-up said blank to channel shape for enclosing at least three sides of a spring.

15. The method of making spring-covers defined by claim 14 which also includes the step of forming out-turned edge flanges on said channel to lie along the fourth side of the spring, said flanges incorporating the ends of said bands.

16. The method of making spring-covers defined by claim 14 in which the channel is formed-up from the face of the blank which leaves said bands at the interior of the channel.

17. The method of making a reinforced blank for spring-covers which comprises forming a plurality of transverse flexing slots for extending around three sides of a spring within a single sheet of material suitable for shaping to channel form and thereafter holding said form, and affixing one or more transverse narrow reinforcing bands to said sheet.

18. In the method of making a reinforced blank for spring-covers according to claim 17, the provision of one or more pairs of longitudinal slots the slots of a pair being oppositely disposed one in each margin of the blank, and affixing a reinforcing band by slipping its ends through the slots comprising a pair.

19. The method of making a blank for spring-covers which comprises forming a longitudinal series of transverse slots within a trapezoidal sheet of metal and also forming a short longitudinal slot at each end of each transverse slot, and applying a covering band to each transverse slot by slipping its ends through the pair of longitudinal slots associated with the transverse slot to be covered.

20. In the method of making a blank for spring-covers according to claim 19 the bending of at least one end of the band at an angle to its remaining portion to facilitate its insertion in a pair of the longitudinal slots.

WARREN T. FERGUSON.